United States Patent
Kim et al.

(10) Patent No.: US 11,975,637 B2
(45) Date of Patent: May 7, 2024

(54) RECLINING APPARATUS FOR SEAT

(71) Applicant: HYUNDAI TRANSYS INCORPORATED, Seosan-si (KR)

(72) Inventors: Sung Chul Kim, Hwaseong-si (KR); Dong Hyeon Son, Hwaseong-si (KR)

(73) Assignee: HYUNDAI TRANSYS INCORPORATED, Seosan-si (KR)

( * ) Notice: Subject to any disclaimer, the term of this patent is extended or adjusted under 35 U.S.C. 154(b) by 0 days.

(21) Appl. No.: 17/940,110

(22) Filed: Sep. 8, 2022

(65) Prior Publication Data
US 2023/0082477 A1    Mar. 16, 2023

(30) Foreign Application Priority Data
Sep. 16, 2021 (KR) .................. 10-2021-0123988

(51) Int. Cl.
*B60N 2/235* (2006.01)
*B60N 2/225* (2006.01)

(52) U.S. Cl.
CPC ......... *B60N 2/2252* (2013.01); *B60N 2/2254* (2013.01); *B60N 2/2356* (2013.01); *B60N 2/2362* (2015.04)

(58) Field of Classification Search
CPC ... B60N 2/2252; B60N 2/2362; B60N 2/2356
See application file for complete search history.

(56) References Cited

U.S. PATENT DOCUMENTS

| | | | | |
|---|---|---|---|---|
| 7,090,298 B2 * | 8/2006 | Lange | .................. | B60N 2/2254 297/362 |
| 8,911,319 B2 * | 12/2014 | Chae | .................. | B60N 2/2254 475/162 |
| 9,706,844 B2 * | 7/2017 | Sakurai | .................. | F16H 35/00 |
| 2014/0162827 A1 * | 6/2014 | Wingensiefen | ....... | B60N 2/2254 475/177 |
| 2015/0054324 A1 * | 2/2015 | Chang | .................. | B60N 2/2254 297/362 |
| 2015/0367758 A1 * | 12/2015 | Chang | .................. | B60N 2/2252 297/361.1 |
| 2020/0164775 A1 * | 5/2020 | Chang | .................. | B60N 2/2227 |
| 2022/0111773 A1 * | 4/2022 | Chang | .................. | B60N 2/2252 |
| 2023/0009295 A1 * | 1/2023 | Chang | .................. | B60N 2/2252 |

FOREIGN PATENT DOCUMENTS

| | | |
|---|---|---|
| EP | 4119392 A1 | 1/2023 |
| KR | 10-2013-0101765 A | 9/2013 |
| KR | 10-2014-0068662 A | 6/2014 |
| KR | 10-1565578 B1 | 11/2015 |
| KR | 10-2017-0141334 A | 12/2017 |
| KR | 20190131826 A * | 11/2019 |
| KR | 10-2020-0049059 A | 5/2020 |
| KR | 20200064262 A | 6/2020 |
| WO | 2009022776 A1 | 2/2009 |

* cited by examiner

*Primary Examiner* — Timothy J Brindley
(74) *Attorney, Agent, or Firm* — Bridgeway IP Law Group, PLLC; Jihun Kim (57) ABSTRACT

Proposed herein is a reclining apparatus for a seat, which secures coupling between a cap and a gear plate through a uniform position adjustment of the cap when the cap of a recliner is assembled, secures operation performance between components, and prevents a bearing from being deformed and separated due to an external force.

6 Claims, 6 Drawing Sheets

RECLINING APPARATUS FOR SEAT

CROSS REFERENCE TO RELATED APPLICATION

The present application claims priority of Korean Patent Application No. 10-2021-0123988 filed on Sep. 16, 2021, the entire contents of which is incorporated herein for all purposes by this reference.

BACKGROUND OF THE INVENTION

Field of the Invention

The present disclosure relates to a reclining apparatus for a seat, and more particularly, to a reclining apparatus for a seat, which secures coupling between a cap and a gear plate through a uniform position adjustment of the cap when the cap is assembled.

Description of the Related Art

A reclining apparatus for a seat is mounted on a seat of a vehicle or the like and performs a function of adjusting an angle of a seatback with respect to a seat cushion and maintaining the adjusted angle of the seatback, thereby achieving convenience of a seated person.

The reclining apparatus is configured such that a gear plate is fixed on the seat cushion, a mobile flange is fixed on the seatback, and the gear plate and the mobile flange are eccentrically engaged with each other to form a cycloid reduction gear, and an eccentric position of the mobile flange with respect to the gear plate is rotated due to a rotating force input through an input device so that the mobile flange is rotated with respect to the gear plate, and thus an angle of the seatback with respect to the seat cushion may be adjusted.

In addition, a cam elastically supported by a spring is inserted between the gear plate and the mobile flange, and the cam may be moved while the input device is rotated so that it is possible to change the eccentric position of the mobile flange with respect to the gear plate by moving the cam due to the rotating force input to the input device. Conversely, since the cam cannot be moved by the rotating force input to the mobile flange, the eccentric position of the mobile flange with respect to the gear plate is stably fixed so that the adjusted angle of the seatback may be stably maintained.

In the reclining apparatus, a cap is assembled with the gear plate to prevent internal components from being separated. That is, the reclining apparatus has a structure of controlling a position using an upper surface of the input device, which is a rotating body component, when the cap is seated. In particular, in the case of the cap, there is a problem in that a separate control device should be configured to secure an inner space of the rotating body, and a position change of the cap becomes large according to conditions of the components so that the cap is assembled with the input device in an overlap condition. Accordingly, there is a problem in that a noise is generated or an operating force is increased due to friction between the components.

Conversely, when the cap is assembled at a position that is higher than a setting position, the internal to components are moved in an axial direction so that degradation occurs in operational sensitivity and strength.

The foregoing is intended merely to aid in understanding of the background of the present disclosure and is not intended to mean that the present disclosure falls within the purview of the related art that is already known to those skilled in the art.

SUMMARY OF THE INVENTION

Accordingly, the present disclosure has been made keeping in mind the above problems occurring in the related art, and the present disclosure is intended to propose a reclining apparatus for a seat, which secures coupling between a cap and a gear plate through a uniform position adjustment of the cap when the cap is assembled, secures operation performance between components, and prevents a bearing from being separated due to an external force.

According to one aspect, there is provided a reclining apparatus for a seat, which includes a cam provided between a mobile flange and a gear plate, an input device connected to pass through the gear plate and formed to cover the cam, a rotation support provided to be interposed between the cam and the gear plate, and a cap formed to cover the input device, and supported in contact with the rotation support when seated on the input device so that an outer surface of the cap comes into uniform contact with the gear plate, and thus welding coupling with the gear plate becomes uniform.

The cap may include a cover seated on the input device and a coupler bent from the cover to be in surface contact with the gear plate, and the coupler may extend to come into contact with the rotation support when the cover is seated on the input device.

The rotation support may be formed such that an end portion of the rotation support facing the coupler matches the coupler.

A seating groove may be formed at the end portion of the rotation support facing the coupler, and the coupler may extend to be inserted into the seating groove of the rotation support.

A support protrusion may be formed at the end portion of the rotation support facing the coupler, and the support protrusion may be formed to be spaced apart from the gear plate so that the seating groove may be formed between the support protrusion and the gear plate.

A chamfer may be formed at the end portion of the rotation support facing the coupler on a side opposite to the gear plate, and a corresponding chamfer matching the chamfer may be formed in the coupler.

An insertion groove of which an inner surface is recessed outward and into which a portion of the rotation support is inserted may be formed in the gear plate, and the coupler may extend to be in contact with the rotation support exposed from the insertion groove of the gear plate.

A plurality of protrusions in contact with the input device may be formed along a circumference of an inner surface of the cover.

BRIEF DESCRIPTION OF THE DRAWINGS

The above and other objects, features and other advantages of the present disclosure will be more clearly understood from the following detailed description when taken in conjunction with the accompanying drawings, in which.

DETAILED DESCRIPTION OF THE INVENTION

Hereinafter, a reclining apparatus for a seat according to exemplary embodiments of the present disclosure will be described with reference to the accompanying drawings.

Figure 1:
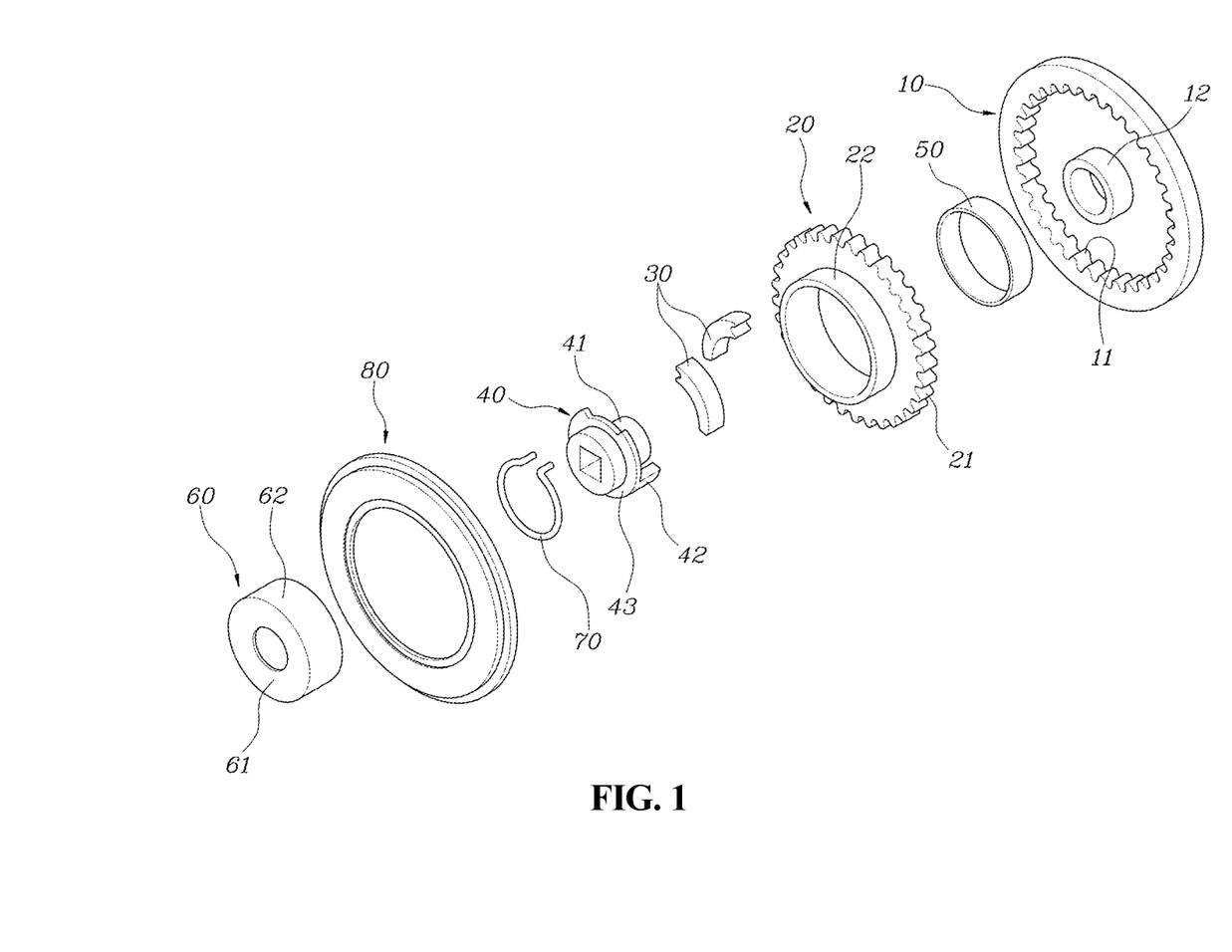
FIG. 1 is a diagram illustrating a reclining apparatus for a seat according to one embodiment of the present disclosure.
Figure 2:
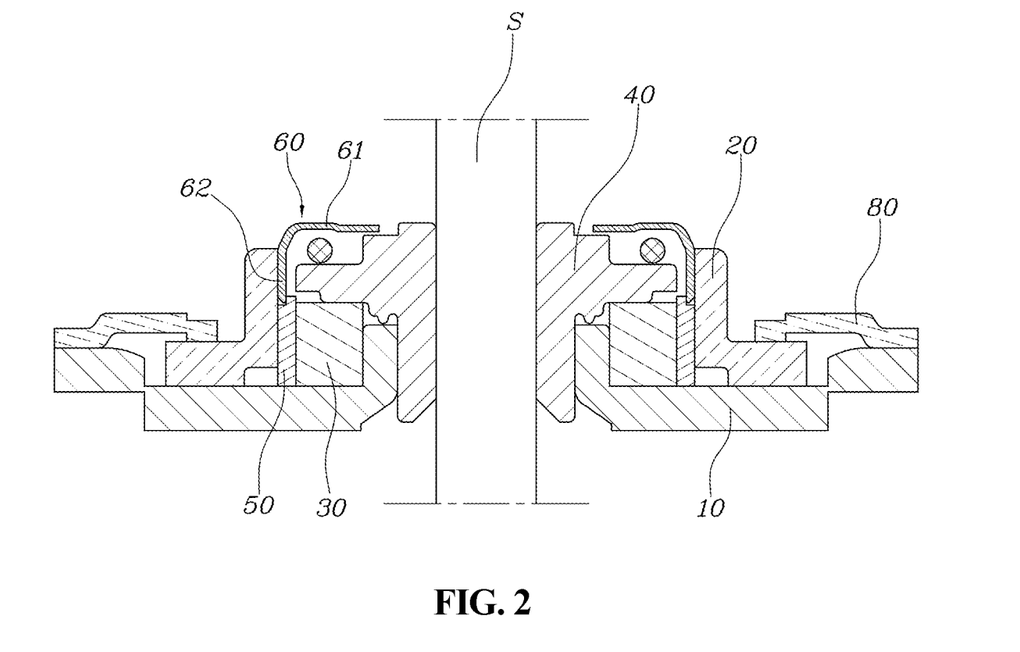
FIG. 2 is a cross-sectional view illustrating the reclining apparatus for a seat shown in FIG. 1.
Figure 3:
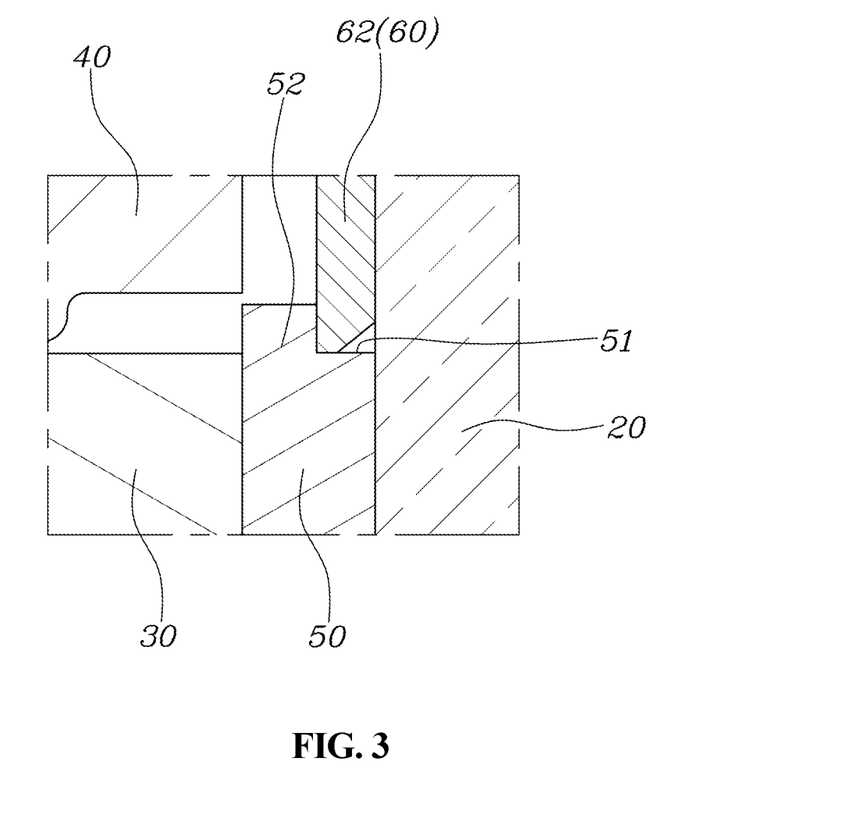
FIG. 3 is a diagram illustrating a rotation support and a cap according to one embodiment of the present disclosure.
Figure 4:
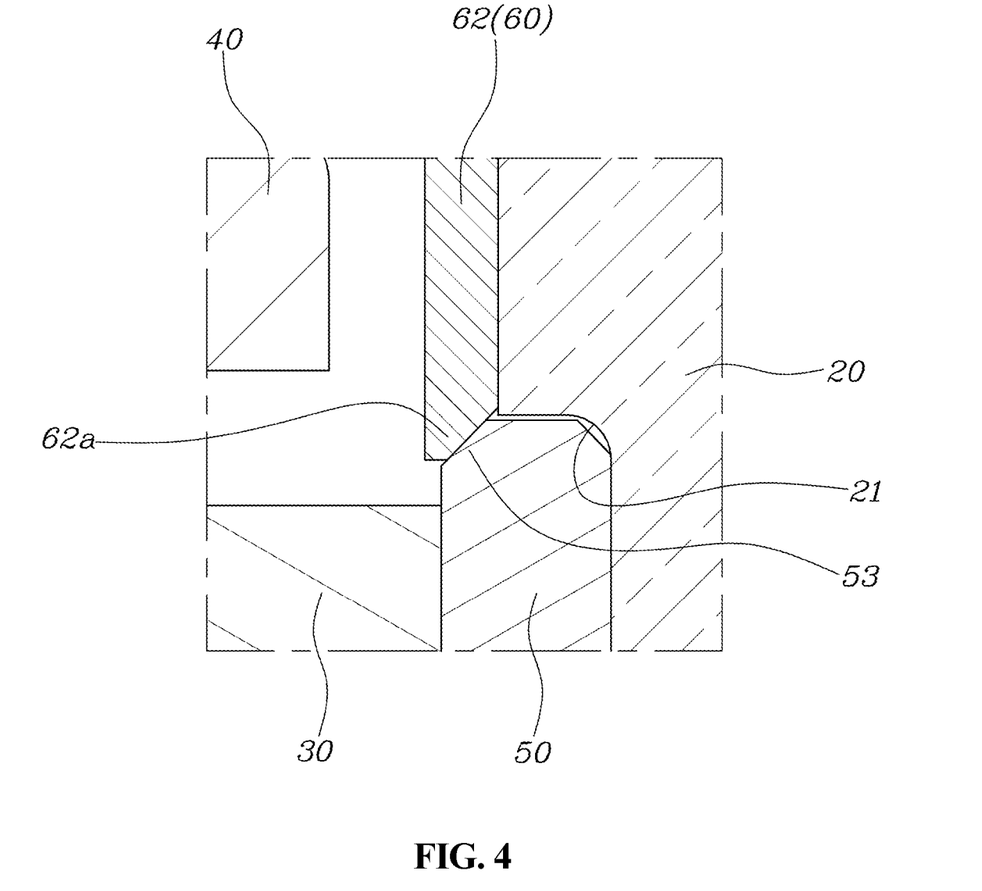
FIG. 4 is a diagram illustrating a rotation support and a cap according to another embodiment of the present disclosure.
Figure 5:
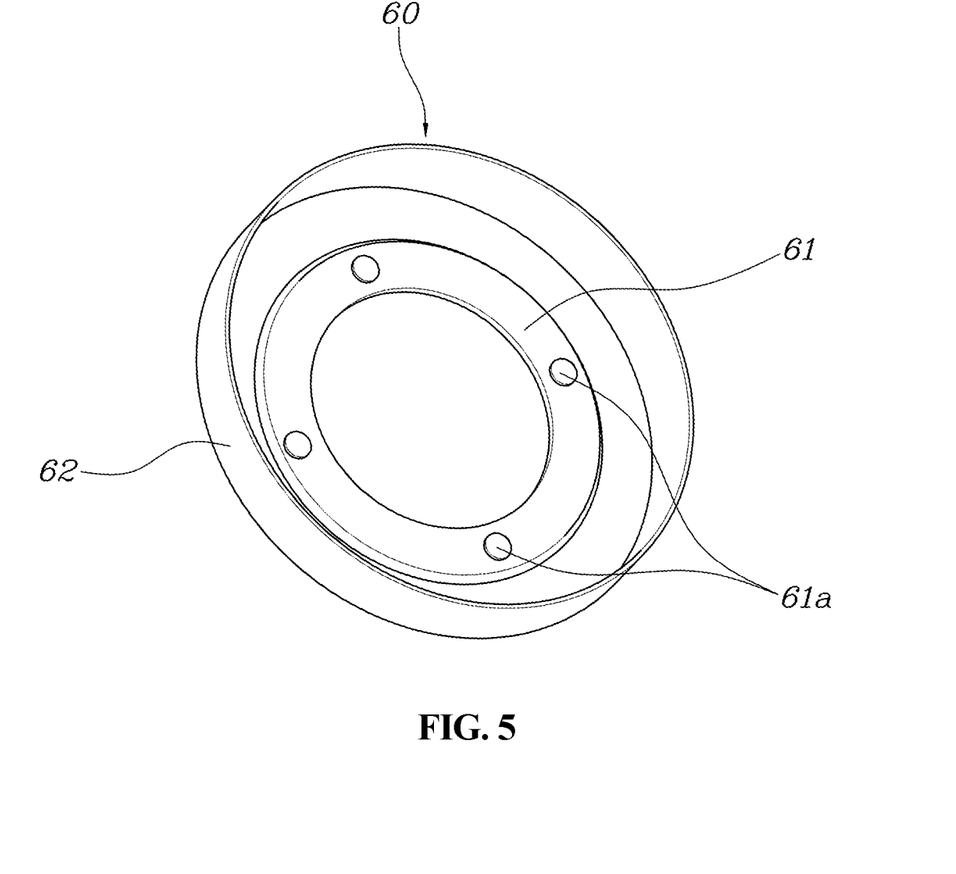
FIG. 5 is a diagram illustrating the cap of the present disclosure.
Figure 6:
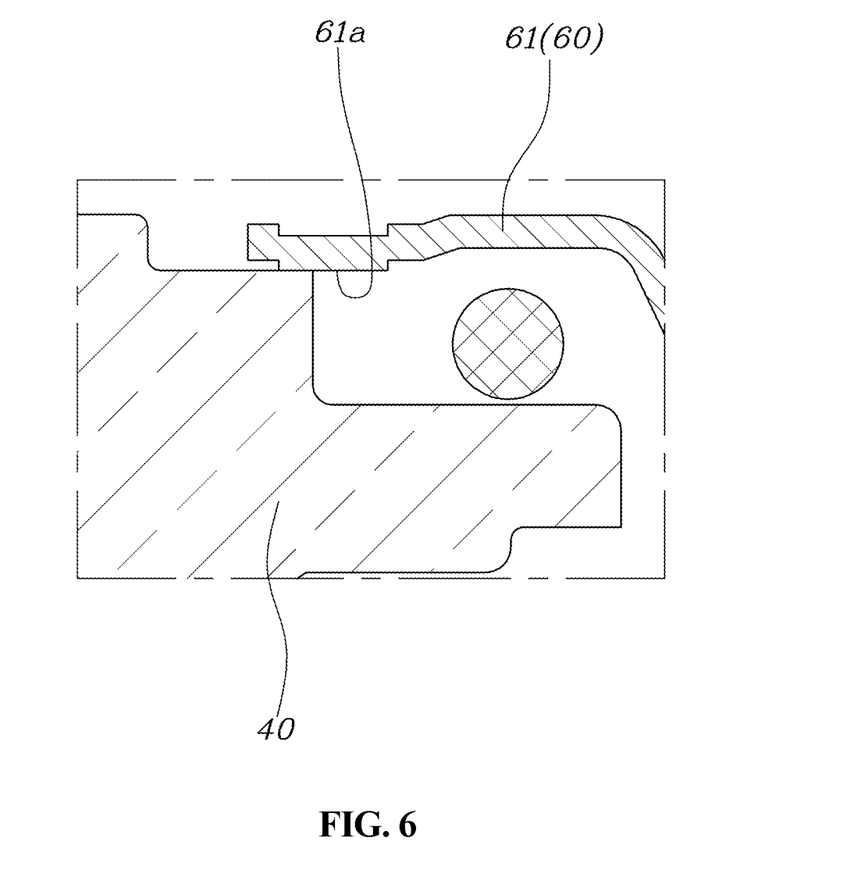
FIG. 6 is a diagram illustrating the cap and an input device according to the present disclosure.

FIG. 1 is a diagram illustrating a reclining apparatus for a seat according to one embodiment of the present disclosure, FIG. 2 is a cross-sectional view illustrating the reclining apparatus for a seat shown in FIG. 1, FIG. 3 is a diagram illustrating a rotation support and a cap according to one embodiment of the present disclosure, FIG. 4 is a diagram illustrating a rotation support and a cap according to another embodiment of the present disclosure, FIG. 5 is a diagram illustrating the cap of the present disclosure, and FIG. 6 is a diagram illustrating the cap and an input device according to the present disclosure.

As shown in FIG. 1, the reclining apparatus for a seat according to the present disclosure includes a mobile flange 10 in which an internal gear 11 is formed and a cylindrical flange protrusion 12 is formed in a central portion, a gear plate 20 in which an external gear 21 engaged with the internal gear 11 is formed and a cylindrical plate protrusion 22 is formed in a central portion, an input device 40 including a central protrusion 41 passing through to be coupled to a shaft S and a device protrusion 42 integrally formed on an outer portion of the central protrusion 41, a rotation support 50 passing through the gear plate 20 to be inserted between an outer side of the device protrusion 42 and the plate protrusion 22 of the gear plate 20, a cam 30 interposed between an outer side of the flange protrusion 12 and the rotation support 50, and a spring 70 inserted and coupled to the cam 30 at both end portions thereof.

In addition, the reclining apparatus for a seat further includes a cap 60 configured to prevent assembly separation between the rotation support 50 and the cam 30 and between the input device 40 and the spring 70.

Here, a circular plate part 43 protruding to an outer side of the central protrusion 41 is integrally formed in the input device 40, and the device protrusion 42 is formed to be connected to the circular plate part 43.

In addition, the spring 70 is installed on one surface of the circular plate part 43 in a tightly adhered state, and both ends of the spring 70 pass through the circular plate part 43 and then are fitted into the cam 30 to form a coupled structure.

The central protrusion 41 of the input device 40 is installed in the form of passing through the plate protrusion 22 of the mobile flange 10, and in this case, the circular plate part 43 covers the rotation support 50 and the cam 30.

In addition, the mobile flange 10 and gear plate 20 are coupled by a retainer 80.

On the other hand, the cap 60 is coupled to the gear plate 20 by welding, and when the cap 60 is biased to one side, the welding between the cap 60 and the gear plate 20 is not correctly performed so that coupling performance is degraded. In addition, when the cap 60 is coupled to the gear plate 20 in a state of not being located at a correct position, there is a problem in that the internal components are moved and thus operating performance is degraded.

Accordingly, as shown in FIG. 2, the present disclosure includes the cam 30 provided between the mobile flange 10 and the gear plate 20, the input device 40 connected to pass through the gear plate 20 and formed to cover the cam 30, the rotation support 50 provided to be interposed between the cam 30 and the gear plate 20, and the cap 60 which is formed to cover the input device 40, which is supported in contact with the rotation support 50 when seated on the input device 40, and of which an outer surface is in uniform contact with the gear plate 20 so that a welding coupling with gear plate 20 becomes uniform.

Here, the rotation support 50 may be formed as a bearing or a bush and is interposed between the cam 30 and the gear plate 20.

In particular, the cap 60 according to the present disclosure is formed to cover the input device 40 and is supported in contact with the rotation support 50 when seated on the input device 40. Thus, when the cap 60 is seated on the input device 40, the cap 60 seals a space between the input device 40 and the gear plate 20 to maintain airtightness, and a circumference of the cap 60 is inserted between the input device 40 and the gear plate 20 to come into contact with the rotation support 50 so that the cap 60 is located at a correct position by the rotation support 50.

That is, when the cap 60 is seated on the input device 40, since the cap 60 comes into contact with the rotation support 50 to be located at a correct position without being biased to either side, a circumferential surface of the cap 60 comes into uniform contact with the gear plate 20 so that the welding coupling with the gear plate 20 becomes uniform. Therefore, improvement in rigidity of the gear plate 20 is achieved.

The cap 60 includes a cover 61 seated on the input device 40, and a coupler 62 bent from the cover 61 to be in surface contact with the gear plate 20, and the coupler 62 extends to come into contact with the rotation support 50 when the cover 61 is seated on the input device 40.

That is, the cap 60 is formed of the cover 61 and the coupler 62, the cover 61 is seated on the input device 40, and the coupler 62 is inserted between the input device 40 and the gear plate 20 so that the cap 60 comes into surface contact with the gear plate 20.

Here, the shaft S passes through the cover 61 to seal a space between the input device 40 and the gear plate 20 so that positions of the internal components are controlled.

The coupler 62 is bent from the cover 61 to extend to come into contact with an inner surface of the gear plate 20 and extends to come into contact with the rotation support 50. In addition, the coupler 62 extends to the same length along the circumference, and the rotation support 50 is formed to have the same length along the circumference so that when the cap 60 comes into contact with the rotation support 50, the cap 60 may be located at a correct position without being biased to either side.

Thus, the cap 60 is coupled by welding in a state in which an outer surface of the coupler 62 comes into contact with an inner surface of the gear plate 20, and the cap 60 is located at a correct position without being biased to either side so that the cap 60 and the gear plate 20 are uniformly welded along the circumference.

Meanwhile, the rotation support 50 may be formed to allow an end portion thereof facing the coupler 62 to match the coupler 62.

In this way, the coupler 62 of the cap 60 and the rotation support 50 are formed to match the portions facing each other so that, when the coupler 62 of the cap 60 comes into contact with the rotation support 50, the cap 60 may maintain a stable support state with respect to the rotation support 50. In addition, when the coupler 62 of the cap 60 comes into contact with the rotation support 50, since the cap 60 is automatically aligned by the rotation support 50, the cap 60 is avoided to be located as being biased to either side so that when the cap 60 and the gear plate 20 are welded, the welding may be performed stably on the entire section of the circumference.

Accordingly, the contact structure between the cap 60 and the rotation support 50 may be applied as various embodiments.

As one example, as shown in FIG. 3, a seating groove 51 is formed at the end portion of the rotation support 50 facing the coupler 62, and the coupler 62 extends to be insertable into the seating groove 51 of the rotation support 50.

In this way, the seating groove 51 is formed in the rotation support 50, and thus the coupler 62 of the cap 60 is inserted into the seating groove 51 and seated thereon. Thus, a position of the cap 60 on the inner surface of the gear plate 20 is controlled to the position where the coupler 62 is inserted into the seating groove 51 of the rotation support 50 so that the cap 60 may be located at a correct position.

In addition, by inserting the coupler 62 of the cap 60 into the seating groove 51 of the rotation support 50, the position of the cap 60 is aligned so that, when the cap 60 is welded to the gear plate 20, the cap 60 is prevented from being biased to either side by welding. Accordingly, the coupling between the cap 60 and the gear plate 20 is improved.

The seating groove 51 of the rotation support 50 may be formed in the gear plate 20. That is, a support protrusion 52 of the rotation support 50 is formed at the end portion facing the coupler 62. The support protrusion 52 is formed to be spaced apart from the gear plate 20, and thus the seating groove 51 is formed between the support protrusion 52 and the gear plate 20.

In this way, in the rotation support 50, the support protrusion 52 protrudes in a direction facing the coupler 62 of the cap 60 so that the seating groove 51 is formed between the support protrusion 52 and the gear plate 20. Thus, when the coupler 62 of the cap 60 is inserted into the seating groove 51, a position of the coupler 62 of the cap 60 is confined between the support protrusion 52 and the gear plate 20. In particular, since the support protrusion 52 is formed to be spaced apart from the gear plate 20, the seating groove 51 is formed in the gear plate 20 side so that the coupler 62 of cap 60 is inserted into the seating groove 51 in a state of being in surface contact with the gear plate 20.

Therefore, when the coupler 62 of the cap 60 is inserted into the seating groove 51 of the rotation support 50, the position of the cap 60 is aligned and the cap 60 is aligned in a balanced way so that, when the cap 60 and the gear plate 20 are welded, the cap 60 is prevented from being biased to either side by welding.

Meanwhile, as another example, a chamfer 53 may be formed at the end portion of the rotation support 50 facing the coupler 62 on a side opposite to the gear plate 20, and a corresponding chamfer 62a matching the chamfer 53 may be formed in the coupler 62.

As shown in FIG. 4, the inclined chamfer 53 is formed at the end portion of the rotation support 50 facing the coupler 62, and the corresponding chamfer 62a having the same inclination as that of the chamfer 53 is formed in a portion of the coupler 62 of the cap 60 in contact with the rotation support 50 so that a contact between the coupler 62 of the cap 60 and the rotation support 50 becomes stable. In addition, the chamfer 53 of the rotation support 50 comes into surface contact with the corresponding chamfer 62a formed on the coupler 62 of the cap 60 so that the cap 60 may be aligned at a correct position.

Meanwhile, an insertion groove 21 of which an inner surface is recessed outward and into which a portion of the rotation support 50 is inserted is formed in the gear plate 20, and the coupler 62 extends to come into contact with the rotation support 50 exposed from the insertion groove 21 of the gear plate 20.

As can be seen in FIG. 4, the insertion groove 21 is formed in the gear plate 20, and the rotation support 50 is provided to be inserted into the insertion groove 21 so that the rotation support 50 may be stably fixed between the gear plate 20 and the cam 30. That is, since the rotation support 50 is inserted into the insertion groove 21 of the gear plate 20, a position separation of the rotation support 50 is prevented and, even when the rotation support 50 is deformed under a compressive load, the position of the rotation support 50 is fixed in the insertion groove 21.

In addition, the insertion groove 21 of the gear plate 20 is formed to allow only the portion of the rotation support 50 to be insertable so that the coupler 62 of the cap 60 may be supported in contact with the rotation support 50 exposed from the insertion groove 21.

As described above, since the rotation support 50 is inserted into the insertion groove 21 of the gear plate 20 and thus the position thereof is fixed, the position of the rotation support 50 become stable, and the coupler 62 of the cap 60 comes into contact with the rotation support 50 stabilized at the correct position so that the position of the cap 60 may also be normally aligned.

Meanwhile, as shown in FIGS. 5 and 6, a plurality of protrusions 61a in contact with the input device 40 may be formed on an inner surface of the cover 61 along a circumference of the cover 61.

That is, in the cap 60, the plurality of protrusions 61a are formed to protrude from the inner surface of the cover 61 so that the protrusions 61a are in point contact with the input device 40. Thus, the cap 60 has a decreased contact area with respect to the input device 40 to reduce vibration or shock transmission.

The protrusions 61a are spaced apart from each other on the cover 61 at regular intervals and protrude in the same length so that the cap 60 is supported in uniform contact with the input device 40 without being biased to either side.

The reclining apparatus for a seat having the structure as described above secures the coupling between the cap 60 and the gear plate 20 through a uniform position adjustment of the cap 60 when the cap 60 of the recliner is assembled, secures the operation performance between the components, and prevents deformation of the rotation support due to an external force.

The reclining apparatus for a seat having the structure as described above secures coupling between the cap and the gear plate through the uniform position adjustment of the cap when the cap of the recliner is assembled, secures the operation performance between the components, and prevents the separation of the bearing due to an external force.

Although the specific embodiments of the present disclosure have been described and illustrated, those skilled in the art will appreciate that various alternations and modifications are possible without departing from the technical spirit of the present disclosure provided in the appended claims.

What is claimed is:
1. A reclining apparatus for a seat, comprising:
a cam disposed between a mobile flange and a gear plate;
an input device connected to pass through the gear plate and formed to cover the cam;

a rotation support interposed between the cam and the gear plate; and a cap formed to cover the input device, and supported in contact with the rotation support when seated on the input device so that an outer surface of the cap comes into uniform contact with the gear plate, and welding coupling with the gear plate becomes uniform, wherein the cap includes a cover seated on the input device and a coupler bent from the cover to be in surface contact with the gear plate, and the coupler extends to come into contact with the rotation support when the cover is seated on the input device, and wherein a seating groove is formed at an end portion of the rotation support facing the coupler, and the coupler extends to be inserted into the seating groove of the rotation support.

2. The reclining apparatus of claim 1, wherein the rotation support is formed such that an end portion of the rotation support facing the coupler matches the coupler.

3. The reclining apparatus of claim 1, wherein a support protrusion is formed at the end portion of the rotation support facing the coupler, and the support protrusion is formed to be spaced apart from the gear plate so that the seating groove is formed between the support protrusion and the gear plate.

4. A reclining apparatus for a seat, comprising:
a cam disposed between a mobile flange and a gear plate;
an input device connected to pass through the gear plate and formed to cover the cam;
a rotation support interposed between the cam and the gear plate; and
a cap formed to cover the input device, and supported in contact with the rotation support when seated on the input device so that an outer surface of the cap comes into uniform contact with the gear plate, and welding coupling with the gear plate becomes uniform, wherein the cap includes a cover seated on the input device and a coupler bent from the cover to be in surface contact with the gear plate, and the coupler extends to come into contact with the rotation support when the cover is seated on the input device, and wherein a chamfer is formed at an end portion of the rotation support facing the coupler on a side opposite to the gear plate, and a corresponding chamfer matching the chamfer is formed in the coupler.

5. The reclining apparatus of claim 1, wherein:
an insertion groove of which an inner surface is recessed outward and into which a portion of the rotation support is inserted is formed in the gear plate; and
the coupler extends to be in contact with the rotation support exposed from the insertion groove of the gear plate.

6. A reclining apparatus for a seat, comprising:
a cam disposed between a mobile flange and a gear plate;
an input device connected to pass through the gear plate and formed to cover the cam;
a rotation support interposed between the cam and the gear plate; and
a cap formed to cover the input device, and supported in contact with the rotation support when seated on the input device so that an outer surface of the cap comes into uniform contact with the gear plate, and welding coupling with the gear plate becomes uniform, wherein the cap includes a cover seated on the input device and a coupler bent from the cover to be in surface contact with the gear plate, and the coupler extends to come into contact with the rotation support when the cover is seated on the input device, and wherein a plurality of protrusions in contact with the input device are formed along a circumference of an inner surface of the cover.

* * * * *